Nov. 20, 1962    J. W. HALTERMAN    3,064,983
PIPE JOINT
Filed Aug. 27, 1959
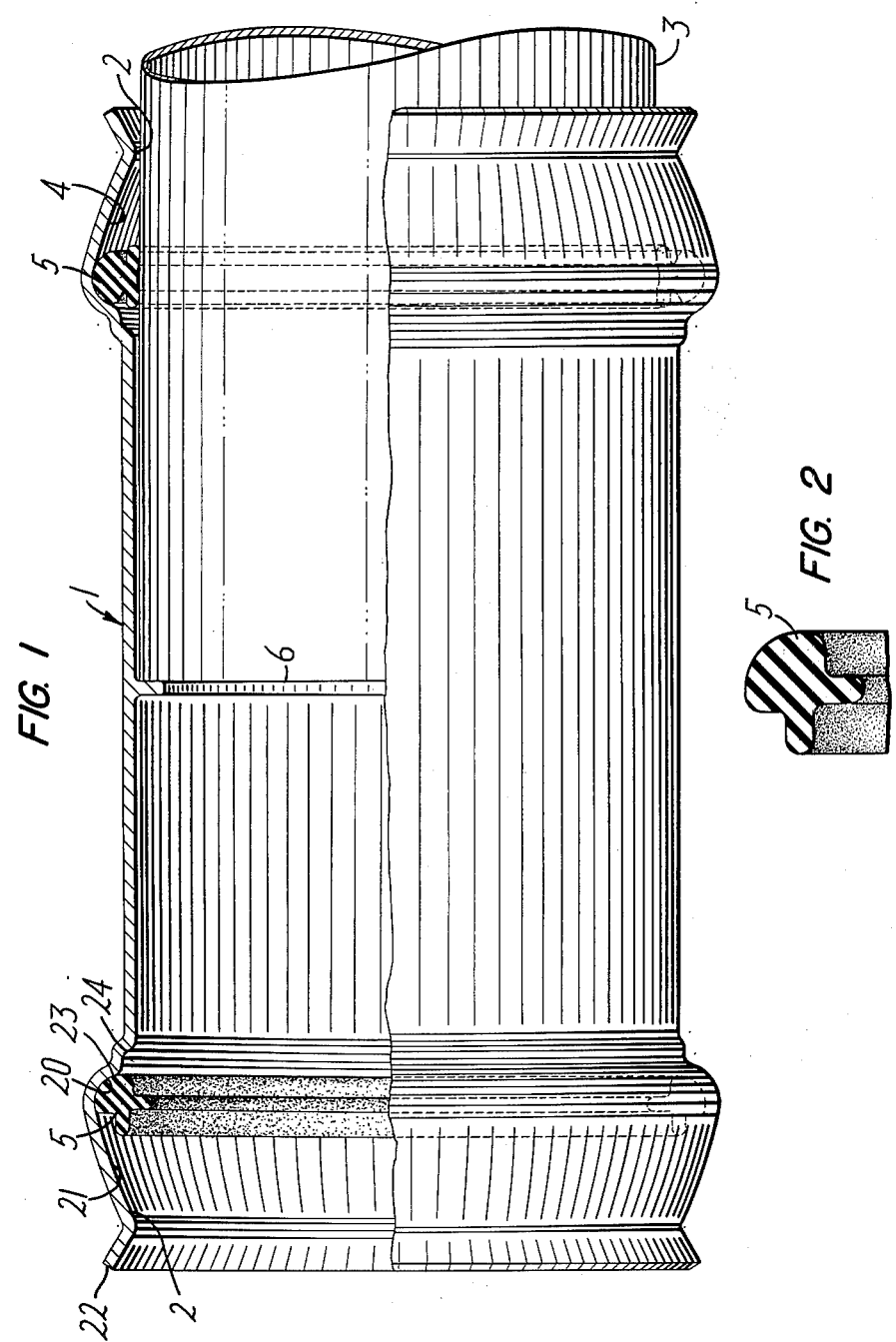

United States Patent Office 3,064,983
Patented Nov. 20, 1962

3,064,983
PIPE JOINT
James W. Halterman, Salamanca, N.Y., assignor to Dresser Industries, Inc., Dallas, Tex., a corporation of Delaware
Filed Aug. 27, 1959, Ser. No. 836,509
6 Claims. (Cl. 277—169)

The present invention relates to pipe joints and in particular to pipe joints in which a plain end pipe section is received in a coupling having a gasket which provides a fluid-tight seal. The term "pipe" is herein used in a generic sense to include pipe, tubing, conduit, shafting and like members. The term "coupling" is herein used to include sleeves, tees, elbows, caps, plugs, valves and other fittings.

It is an object of the present invention to provide a simple and inexpensive pipe coupling with which a pipe joint is easily and quickly effected merely by stabbing a plain end pipe into the coupling. No operations such as tightening bolts, nuts, collars or other mechanical devices are required and no tools are needed. A further feature of couplings in accordance with the present invention is that a fluidtight seal is provided not only against leakage of fluid from the pipeline but also against the ingress of fluid from outside the pipeline. The latter is of particular importance in underground lines where it is desirable to avoid any ground water leaking into the line when the line is temporarily out of service or is operated at a pressure lower than the ground water pressure. Couplings in accordance with the invention have the further advantage that they have a smooth contour and an overall diameter not greatly exceeding that of the pipe so that they can be easily taped or otherwise covered or coated along with adjacent portions of the pipe sections to provide corrosion resistance.

The objects, advantages and characteristics of pipe joints in accordance with the present invention will be more fully understood from the following description and claims in conjunction with the accompanying drawings which illustrate by way of example a preferred embodiment of the invention. In the drawings:

FIG. 1 is an axial half section of a pipe coupling in accordance with the invention, a pipe section being shown in place in one end portion only of the coupling. The opposite end portion of the coupling is shown in condition to receive a second pipe section.

FIG. 2 is a cross section on a larger scale of a gasket in accordance with the invention.

In FIG. 1 there is shown by way of example a pipe coupling in accordance with the invention comprising a double ended coupling sleeve 1 which is symmetrical about a central transverse plane. At each end the coupling sleeve 1 is shaped to provide a circular pipe aperture 2 having an inside diameter only slightly greater than the outside diameter of a plain end pipe section 3 and an annular channel 4 providing a recess for an annular gasket 5. Axially inwardly of the gasket recess 4 the sleeve 1 is approximately cylindrical with an inner diameter slightly greater than the outside diameter of the pipe 3 and approximately equal to the diameter of the pipe aperture 2 so that a pipe can readily be stabbed into the coupling as shown in the right hand portion of FIG. 1. The coupling sleeve 1 is preferably provided with a pipe stop 6 consisting of one or more inward projections or, as illustrated in FIG. 1, a continuous inwardly projecting ring having an inside diameter approximately equal to the inside diameter of the pipe.

The annular gasket 5 is formed of elastomer material, for example a natural or synthetic rubber composition. The gasket material is preferably elastic and yet firm with a durometer of the order of 60 to 80 and a high shear strength. Preferably the durometer of the gasket material is approximately 65 to 75. In cross section, the gasket comprises a body portion 8 having a curved convex outer surface 9. Preferably the body portion of the gasket is approximately semi-circular in cross section but with rounded corners 11. Projecting from the body portion of the gasket, there are two flange portions which are integral with the body. In unconfined condition, an inner flange portion 12 projects radially inwardly from the body portion of the gasket. An outer flange 13 projects axially outwardly from the body portion of the gasket and is preferably approximately parallel to the axis of the gasket. The two flanges 12 and 13 merge into the body portion of the gasket and into each other with smooth concave curves 14 and 15. The outer edge portions of the flanges are rounded as indicated at 16 and 17. The gasket is preferably symmetrical in cross section about a line bisecting the angle between the flanges 12 and 13. The angle between the two flanges is shown as being approximately 90°. The width of the flanges measured from the center of curvature of the curved outer surface 9 to the edges 16 and 17 of the flanges is greater than the radius of curvature of the surface 9, being for example 50% greater.

The gasket recess 4 of the coupling sleeve 1 viewed in radial section has a concave curved surface 20 on which the gasket seats. The curvature of the concave surface 20 is preferably about the same complementarily as the curvature of the convex outer surface 9 of the gasket. Outwardly of the surface 20 the inner surface of the gasket recess tapers radially inwardly as indicated at 21 and merges smoothly into the pipe aperture 2. As viewed in radial section, the inwardly tapering surface 21 is preferably slightly concave. Axially outwardly of the pipe aperture 2 the coupling sleeve is flared outwardly to provide a flange 22 which assists in guiding the end of the pipe into the pipe aperture. Axially inwardly of the surface 20, the inner surface of the gasket recess curves inwardly to provide a shoulder 23 which merges smoothly into the surface 20 and at its inner portion is approximately perpendicular to the axis of the coupling sleeve. Axially inwardly of the shoulder 23, there is shown an annular recess 24.

While the gasket 5 may be inserted in the gasket recess 4 at any time before the pipe 3 is stabbed into the coupling, the gaskets are preferably inserted at the factory before the couplings are shipped out. There is thus provided a complete self-contained coupling. The gaskets are retained in the gasket recesses through their inherent resiliency and are protected by the coupling. When inserted in the gasket recess, a gasket takes the position shown at the left hand side of FIG. 1. The outer curved surface 9 of the gasket seats on the curved surface 20 and shoulder 23 of the gasket recess. The inner flange 12 projects radially inwardly. The edge 16 of the inner flange 12 defines a circle which has a diameter smaller than the outside diameter of the pipe 3. The outer flange 13 projects axially outwardly and is disposed radially outside of a cylindrical surface defined by the pipe aperture 2 and the axially inner portion of the coupling sleeve 1.

When a plain end pipe is stabbed into the coupling sleeve through the pipe aperture 2, it engages the inner flange 12 of the gasket. As the pipe continues to move axially inwardly, the engagement of the end of the pipe with the inner flange 12 causes the gasket to rotate to the position shown at the right hand side of FIG. 1. As the pipe passes through the gasket, the inner flange 12 is stretched and hence engages the pipe wall with a stretch fit. The recess 24 provides clearance for the inner flange 12 of the gasket so as to avoid any possibility of the flange being pinched between the pipe and the coupling sleeve. By virtue of the rotation of the gasket as the pipe is stabbed in, the outer flange 13 is swung inwardly into close engagement with the pipe wall.

When the pipeline is put in service, fluid pressure in the line tends to press the inner flange 12 of the gasket against the pipe with a force proportional to the line pressure so as to maintain a fluidtight seal under all operating pressures. Moreover, the line pressure also tends to force the gasket 5 axially outwardly so as to wedge tightly in the space between the wall of the pipe and the inwardly tapering surface 21 of the gasket recess. Leakage of fluid from the pipeline is thereby prevented. Moreover, the engagement of the outer flange 13 of the gasket with the pipe wall provides a similar seal against the ingress of fluid into the pipeline from the outside. Hence, if the pipe is underground, the leakage of ground water into the pipe is prevented even though the pipeline is temporarily out of service or is operating at a pressure lower than that of the ground water.

In a preferred embodiment of the invention the coefficient of friction between the gasket and the inner surface of the gasket recess is materially reduced so as to be substantially below the coefficient of friction between rubber and steel or other material of which the pipe is made. Preferably the coefficient of friction between the gasket and the inner surface of the gasket recess is not more than one fourth that between the gasket and the pipe. The differential in the coefficients of friction can be obtained in various ways. For example the inner surface of the gasket recess can be appropriately lubricated. Preferably however the inner surface of the gasket recess is covered with a permanent thin layer of low friction material, for example tetrafluoroethylene resin sold commercially under the name "Teflon." The resin is conveniently applied to the surface as a water dispersion and then sintered at a temperature of the order of 75° F. Two or more coatings may be applied if desired. Other low friction materials for coating the gasket recess surface include fluorochlorocarbons such as trifluorochlorethylene sold under the trade name "Kel–F." Alternatively or in addition to coating the inner surface of the gasket recess, the outer surface 9 of the gasket may be treated to reduce the coefficient of friction. For example the gasket may be formed of a rubber composition, the outer surface of which is halogenated, for example by being treated with bromines.

The reduction of the coefficient of friction between the outer surface of the gasket and the inner surface of the gasket recess has two important advantages. In the first place, it facilitates rotation of the gasket from the position shown at the left hand end of FIG. 1 to the position shown at the right hand end of FIG. 1 as a pipe is stabbed into the coupling. In the second place, line pressure or other forces tending to pull the pipe out of the coupling cause the gasket to wedge tightly between the wall of the pipe and the tapered inner surface 21 of the gasket recess. The greater the pull exerted on the pipe, the more tightly will the gasket wedge. The pipe is thereby effectively locked in place so as to prevent its withdrawal.

It will thus be seen that the invention provides a simple and economical yet highly effective pipe coupling having important advantages over those heretofore available. While the invention has been shown by way of example in the form of a double ended coupling intended for joining two lengths of plain end pipe in end-to-end relationship, it will be understood that the invention is equally applicable to ells, tees, crosses and other fittings. Moreover, modifications in details of construction may be made without departing from the scope of the invention as defined by the following claims.

What I claim and desire to secure by Letters Patent is:

1. A pipe coupling comprising a shell defining a pipe-receiving opening and an inner concave annular channel coaxial with said opening and surrounding an end portion of a pipe inserted in said opening, said inner concave channel opening radially inwardly and an annular gasket positioned in said channel and comprising in cross section a body portion having a convex curved outer surface engaging in said inner concave channel, a first flange which in free position projects radially inwardly from said body portion toward the axis of said annular channel in a position to be engaged by a pipe when inserted through said opening and a second flange portion which in free position projects axially outwardly from said body portion in a position substantially out of the path of a pipe when inserted through said opening, said gasket being rotated in place in said channel by engagement of the end of a pipe with said first flange when said pipe is stabbed through said opening and said first flange being swung axially inwardly and radially outwardly and being expanded circumferentially to permit the end of said pipe to pass through the gasket, whereupon said first flange tightly engages the peripheral surface of the pipe to provide a fluidtight seal preventing egress of fluid from the coupling, said rotation of the gasket swinging said second flange radially inwardly into engagement with the peripheral surface of said pipe to provide a fluidtight seal between said pipe and said gasket flanges and the convex surface of said gasket body portion being pressed in said inner concave channel to provide a fluid tight seal between said gasket body and said shell, said gasket thereby preventing ingress and egress of fluid into said coupling between said shell and said pipe.

2. A pipe coupling according to claim 1, in which said body portion of the gasket is substantially and convexly semi-circular in cross section.

3. A pipe coupling according to claim 1, in which said flanges are disposed at an angle of approximately ninety degrees to one another.

4. A pipe coupling according to claim 1, in which said gasket in cross section is approximately symmetrical about a line bisecting the angle between said flanges.

5. A pipe coupling according to claim 1, in which said inner concave channel has a concave curved inner surface approximately complementary to the convex curved outer surface of the body portion of the gasket.

6. A pipe coupling according to claim 1, in which said shell defining said inner concave channel is coated with a material having a low coefficient of friction whereby said gasket is relatively unrestricted by friction between said gasket and said shell in rotating in place in said channel.

References Cited in the file of this patent

UNITED STATES PATENTS

| | | |
|---|---|---|
| 2,807,511 | Fleming | Sept. 24, 1957 |
| 2,809,853 | Nathan | Oct. 15, 1957 |
| 2,841,429 | McCuistion | July 1, 1958 |
| 2,968,501 | Tisch | Jan. 17, 1961 |